May 18, 1965 R. W. LARSON 3,183,954
SHEARS

Filed July 10, 1963 4 Sheets-Sheet 2

INVENTOR.
Robert W. Larson
BY
ATTORNEY

May 18, 1965 R. W. LARSON 3,183,954
SHEARS
Filed July 10, 1963 4 Sheets-Sheet 3

INVENTOR.
Robert W. Larson
BY
*Henry Powers*
ATTORNEY

May 18, 1965 R. W. LARSON 3,183,954
SHEARS

Filed July 10, 1963 4 Sheets-Sheet 4

INVENTOR.
Robert W. Larson
BY
ATTORNEY

United States Patent Office 3,183,954
Patented May 18, 1965

3,183,954
SHEARS
Robert W. Larson, Sanborn, Wis., assignor to Beloit Corporation, a corporation of Wisconsin
Filed July 10, 1963, Ser. No. 294,031
12 Claims. (Cl. 144—34)

This invention relates to shears and more particularly to shears adapted for forestry operations. This application is a continuation-in-part of co-pending application Serial Number 113,816, filed May 31, 1961, now Patent No. 3,122,184.

It is an object of this invention to provide novel shearing means for improving forestry operations.

It is another object of this invention to provide a novel shearing means for tree harvesting adapting the shear for facilitating manipulation of trees cut therewith.

A further object of this invention is to provide a novel shearing means for felling standing trees and facilitating their subsequent manipulation.

A still further object of this invention is to provide novel shearing means for processing of trees to be harvested in forests.

Other objects and advantages of this invention will become more apparent from the following description and drawings in which.

Figure 1:
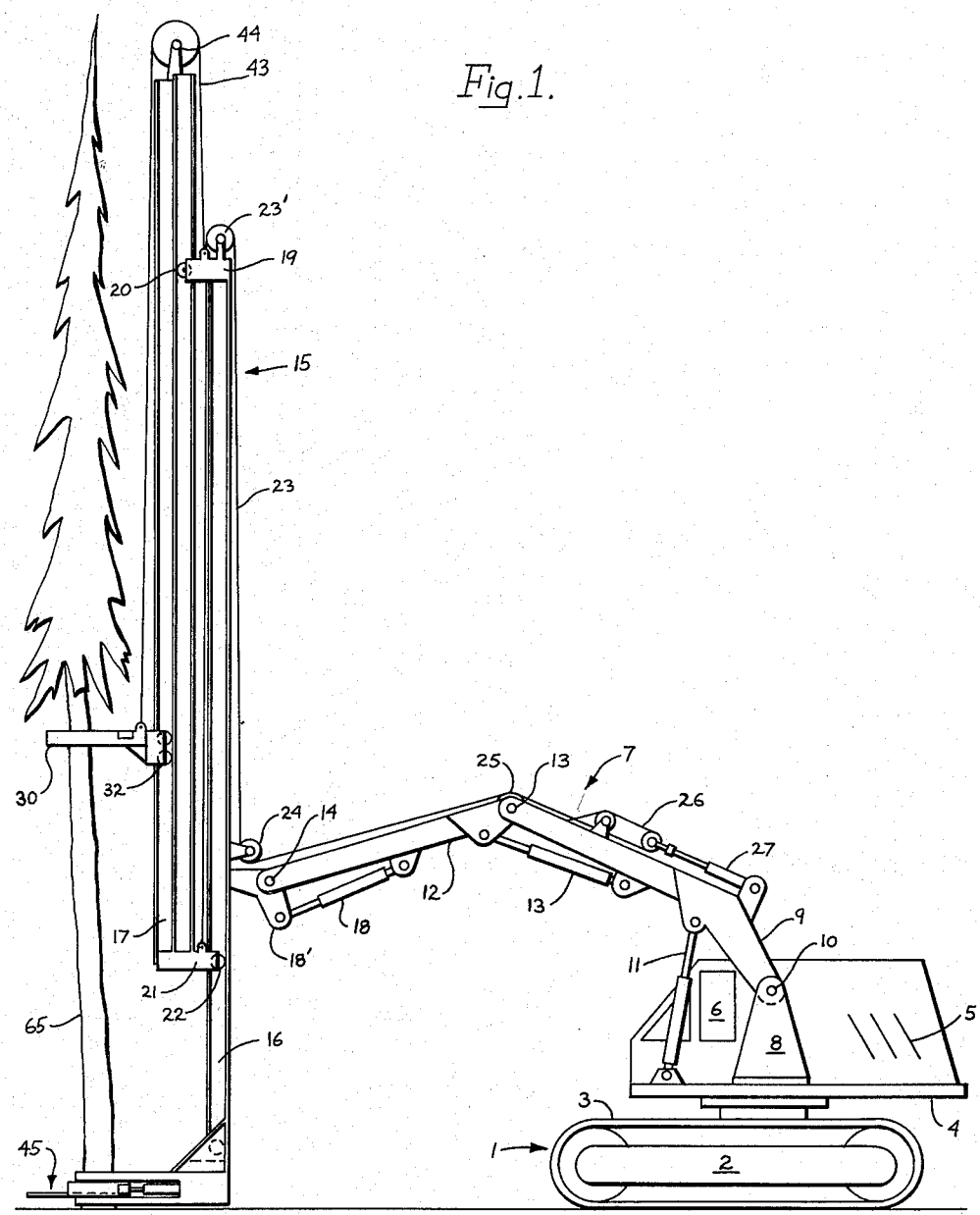
FIGURE 1 is an elevational view of a structure incorporating one embodiment of this invention.

Broadly speaking, the shears of this invention comprise a frame means having pivotly mounted thereon blade means which are movable between opened and closed positions for cutting objects thereby. For a particular use contemplated for the shears of this invention, the blades are adapted for extension in a horizontal plane and having an upper surface, adjacent a platform for support of an object cut by the blades when the blade means are in their closed position. In addition, the shears are also provided with a vertically extending flange means or retaining wall adjacent the trailing edge of the blade means whereby the flange and the frame co-operate with each other to form an enclosing or retaining wall about the platform, formed by the blade means in its closed position, so as to confine cut objects on the platform. Although the shears of this invention have a versatility adapting them for use in various applications, a particular utility contemplated for these shears in their use in conjunction with a tree harvesting apparatus disclosed in co-pending application Serial Number 196,195, filed May 21, 1962, and with which this invention will be described in complementing relationship.

The invention described in the said co-pending application Serial Number 196,195 includes, as shown in the drawings of this application, means for encircling a standing tree with a vertically extending blade member and then rapidly propelling the blade member up and along the tree with great speed and force so as to impart sufficient momentum to the blade member to cause it to cleave, by impact, all protruding branches encountered thereby. Also, this structure includes a top cutting means which tops the delimbed tree, and in addition is, herein, provided with the shears of this invention utilized as additional bottom cutting means for bottom shearing the topped and delimbed tree.

More specifically, by reference to the drawings, FIGURE 1 illustrates a mobile vehicle or carriage denoted generally by the reference number 1 which can assume a variety of mechanical constructions. The vehicle includes a chassis or frame sub-structure 2 equipped with endless tracks 3, and surmounting the chassis 2 is a swinghouse assembly 4 which is rotatable about a vertical axis by mounting thereof on a turntable operatively connected to the chassis. The swinghouse assembly also includes an engine 5 providing propelling power for the vehicle as well as hydraulic power for various cylinders yet to be described. Also located on the swinghouse assembly is an operator's cab 6.

Indicated generally by the reference number 7 is an articulated or reach boom assembly mounted on the swinghouse platform by means of a pair of uprights or standards 8. The boom assembly includes a first arm or rear boom section 9 swingably connected to the standards 8 by means of a pivot pin or shaft 10. Raising or lowering of the boom section 9 is accomplished by means of a hydraulic cylinder-piston assembly 11 pivotly connected to and between the boom section 9 and the uprights 8.

In addition, as shown on the drawing, the boom assembly 7 also includes a second arm or boom section 12 pivotly connected to the rear boom section by means of a pivot 13. Relative movement between the front and rear boom sections 9 and 12 is effected by means of a hydraulic cylinder-piston assembly 13 pivotally connected to and between the boom sections 9 and 12.

Mounted for pivotal movement about pivot pin 14 at the distal end of the front boom section 12 is a sliding mast assembly 15 comprised of a stationary mast unit 16 and a traveling second mast unit 17 operatively connected together in longitudinally reciprocating relationship with both of the mast units illustrated here as having an I-beam configuration. Control of pivotal movement of the mast assembly relative to the boom assembly is effected by means of a hydraulic cylinder piston assembly 18 operatively connected between and to the first mast unit 16 and the front boom section 12 with the connection effected through the agency of a bell crank $18^1$ secured to the first mast unit 16 and to the hydraulic cylinder-piston assembly 18. At the upper end of the mast unit 16 is a bracket 19 fixedly attached thereto and provided with guide wheels 20 which are engaged between and bear against the flanges of the second mast unit 17. A lower bracket 21 is secured adjacent the bottom of the second mast unit 17 and is similarly provided with guide wheels 22 which ride between the flanges of the first mast unit 16. As will be appreciated, this inter-connection connects the two mast units together in a manner in which the traveling second mast unit 17 is constrained to follow a reciprocal path relative to the first mast unit 16 due to the co-action provided by the guide wheels 20 and 22 riding between the flanges of the mast units.

In order to effect the raising and lowering of the second mast unit 17 relative to the first mast unit, a flexible cable 23 is connected at one end to the lower end of the traveling mast unit 17 and then extended upwardly between the mast units, over a sheave or pulley $23^1$ rotatably mounted at the top of the stationary first unit 16. In addition, the cable 23 is then passed downwardly to another pulley 24 and over an additional sheave or pulley 25 rotatably mounted at the joint of the rear and front sections 9 and 12, with the cable then being operatively connected to a multiple sheave block assembly 26 comprised of multiple sheave blocks disposed in co-operating relationship with each other and adapted for effecting speed multiplication in the upward and downward travel of the reciprocating mast units. As will be noted, the cable 23 after extension from the mast assembly to the sheave block assembly, is then passed back and forth between and over the multiple sheave blocks for several loops and then secured or anchored to the rear boom section 9. As illustrated, an extensible hydraulic cylinder-piston assembly 27 is operatively connected between the sheave block assembly 26 and the rear boom section 9. As shown in the drawing and noted above, the operative connection of the flexible cable 23 to the traveling mast unit 17 is completed by securement of the distal end of the cable to the traveling mast unit 17 in any convenient place thereon, as for example to the bracket 21 which is affixed to the traveling mast unit 17.

As will be appreciated, a short travel of the piston of the hydraulic assembly 27 will greatly multiply the travel of the flexible cable 23 so as to effect a shift rise and fall of the traveling second mast unit 17 and its associated mechanisms. It will be noted that the constant pressure applied to the hydraulic cylinder-piston assembly 27 causes the flexible cable 23, through the speed multiplying function of the block assembly 26, to accelerate when pulling the traveling mast unit 17 upwardly from a position of rest, with corresponding and associated acceleration effected in the traveling mast unit 17.

In a completely mechanized unit illustrated in the drawings, the structure also includes a mechanism for delimbing protruding branches from standing trees and which mechanism may take the construction illustrated in the aforesaid co-pending application Serial Number 196,195. Accordingly, the delimbing mechanism indicated generally by the reference number 30 includes a U-shaped frame structure 31 which may be formed of a spaced plate construction suitably enclosed within a housing such as shown in FIGURE 1 with the operative connection of the delimbing mechanism to the traveling mast unit effected by the mounting of the delimbing mechanism to the brackets 32 provided with suitable tracking mechanism for engagement with and between flanges of the traveling mast unit 17. This frame structure may be secured to the traveling mast unit 17 in any suitable manner, as for example it may be pivotally mounted to the bracket 32 about a pivot pin 33. Bracket 32 is adapted for sliding movement up the traveling mast unit 17 by means of any suitable tracking mechanism $32^1$, such as guide wheels, which engage a track defined between the flanges of the traveling mast unit 17 and a secondary co-extending mast track $17^1$, such as an I-beam or T-beam, secured, as by welding, thereto.

Figure 2:
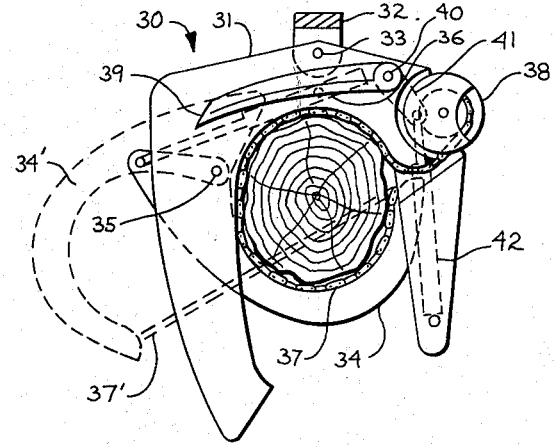
FIGURE 2 is a plan view of a delimbing mechanism utilized in the structure of the preceding figure for removing branches from standing trees.
Figure 3:
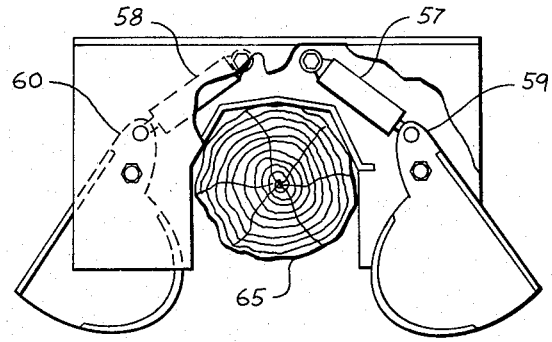
FIGURE 3 is a plan view partly in section illustrating the details of the embodiment utilized in the structure shown in the preceding figure.
Figure 4:
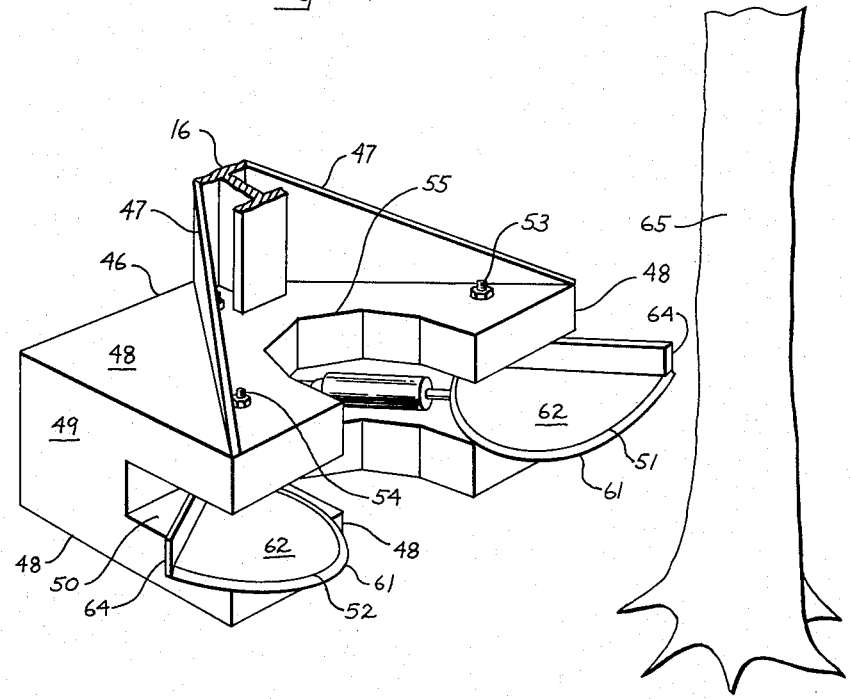
FIGURE 4 is a perspective view of the embodiment illustrated in FIGURE 3.
Figure 5:
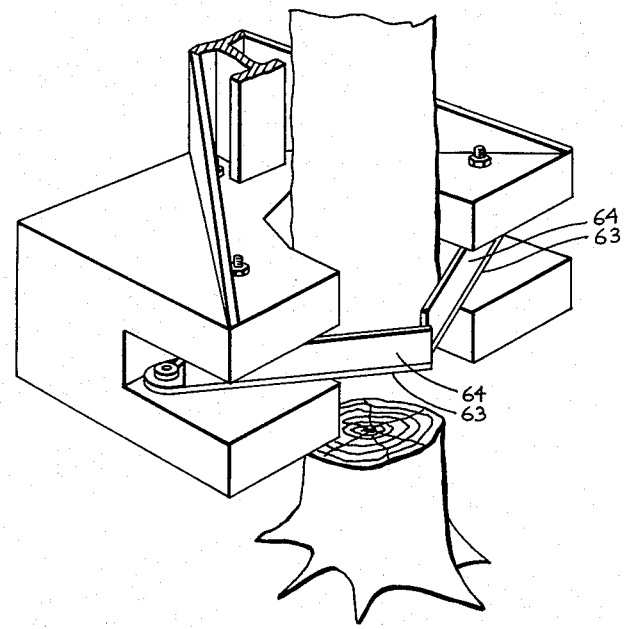
FIGURE 5 is a perspective view illustrating the operation of the embodiment of the preceding figures.

The delimbing structure also includes an encircling arm 34 which is pivotally mounted about a pivot 35 within the frame structure 31. Actuation of the arm is effected by means of a hydraulic cylinder-piston assembly 36 pivotally connected to the frame structure and to an offset portion of the encircling arm 34. As will be appreciated, when the hydraulic cylinder-piston assembly 36 is in a retracted position, the arm 34 assumes the position illustrated as $34^1$ denoted by the phantom lines of FIGURE 2. Conversely, the extended position of the hydraulic cylinder-piston assembly 36 causes the encircling arm 34 to assume the position shown by the phantom lines defining it in FIGURE 2. Also connected at the distal end of the encircling arm 34 is a flexible knife or blade structure 37 which, if desired, may be in the form of a link chain. As shown in the drawings, one end of the chain is secured to the distal end of the arm 34 and the other end of the blade structure is attached at a spool or drum 38 which is biased in any suitable manner, as for example either by hydraulic motor or spring means, for rotation in a counter-clockwise direction so as to constrain the flexible knife structure to be wound on the spool when no force is applied to it to overcome the biasing action provided by the drum 38. Thus when the encircling arm 34 is in an extended position, as shown by the phantom lines $34^1$, in the absence of any tree disposed within the opening of the U-shaped frame 31, then the flexible knife structure or chain 37 will assume the phantom position $37^1$ shown in this figure.

Also included in conjunction with the tree delimbing means is a top shear 39 which is adapted to top trees when the delimbing mechanism 30 is actuated to the desired position on the tree. Operative connection of the top shear 39 is effected by its securement to a shaft 40 which extends downwardly through the frame 31 and provided with a lever arm 41 secured to the bottom of the shaft. Actuation of the top shear is effected by means of a hydraulic cylinder-piston assembly 42 which is pivotally connected between and to the frame 31 and the lever arm 41.

To effect the movement of the delimbing mechanism up the traveling mast unit 17, a cable 43 is attached at one end to the delimbing mechanism and passed upwardly over a sheave or pulley 44 mounted at the top of the traveling mast unit 17 and with the other end of the cable fixedly secured to the top of the stationary mast unit 16 as for example to the bracket 19 already secured to the stationary mast 16. Thus, actuation of the hydraulic cylinder-piston assembly 27 causes the cables 23 and 43, due to their speed multiplication connection, to propel or project the delimbing mechanism 30 with terrific speed up the extending mast assembly 15 which imparts to the delimbing mechanism terrific momentum in order to cleave by impact all protruding branches encountered by the flexible knife structure 37 of the delimbing mechanism 30. Although a specific delimbing mechanism has been indicated, it is to be understood that other units may be adapted for use in conjunction with this invention, as for example such as the unit disclosed in U.S. Letters Patent No. 2,948,311, where and when the rapid function of the specifically described delimbing unit is not required.

Also, fixedly mounted to the bottom of the second mast unit 17 in substantially horizontal extension therefrom is a tree cutting mechanism 45 of this invention. In one embodiment, the tree cutting mechanism takes the basic form of the structure shown in co-pending application Serial Number 113,816 (now Patent No. 3,122,184 as hereinbefore mentioned), with the structure comprised of a U-shaped frame 46 rigidly secured to the fixed mast unit 16 and reinforced thereon by means of gusset plates 47. As will be appreciated, the frame structure may be comprised of spaced plates 48 enclosed within a housing 49, and provided with a kerf or gap 50 for receiving therein shear blades 51 and 52 which are pivotally mounted to the frame structure about respective pivots 53 and 54. In addition, if desired, the bight of the U-shaped frame 46 can be provided with a reinforced rear butt plate 55 for abutment against the tree to be sheared. As will be appreciated, this rear plate 55 together with the extended arms are stubs of the U-shaped frame and form a cradle support for the timber which will be cut. Reciprocal opening and closing shearing movement of the shear blades 51 and 52 forward and away from each other is effected by means of hydraulic cylinder-piston assemblies 57 and 58 which are pivotally mounted between and to the frame 46 and an offset portion, respectively, 59 and 60 of the blades 51 and 52. As will be observed in the drawings, the leading or cutting edges 61 of the blades 51 and 52 are provided with an arcuate configuration defining a concave projection 62 on each blade which extends inwardly toward each other, within the opening defined between the extending arms of the U-shaped frame 46, for camming and shearing action against a standing tree disposed in the opening during convergent movement of the blades. In addition, in accordance with this invention, provided adjacent the trailing edge 63 of each of the blades 51 and 52 is a vertically extending flange 64 adapted to come within close proximity with each other when the blades are in their converged or closed relationship and to define thereon in conjunction with the frame of the cutting mechanism, a retaining or enclosing wall to confine cut objects on the shears when they are in their closed position. In this regard, it will be noted that the top or upper surface of the shears has a planar extension which co-extends across the opening of the U-shaped frame when the blades are converged, and together to define a platform to support cut objects thereon.

In operation, the vehicle 1 is moved into position to enable it, through the reach boom assembly 7, to position the bottom cutting mechanism 45 and the delimbing mechanism 30 into encirclement about a standing tree 65. As the delimbing mechanism is moved into encircling or embracing relationship with the standing tree 65, the flexible knife structure 37 will be forcibly deflected from its phantom outline position at FIGURE 2 into a partially embracing relationship with the tree with the necessary length of chain being payed out by a spool 35. Thereafter, the operator actuates the hydraulic cylinder-piston assembly 36 to cause the encircling arm 34 to close about the tree received within the opening of the frame 31 with simultaneous wrapping of the flexible knife structure 37 about the tree. Concurrently, the bottom cutting mechanism 45 is positioned so as to receive the standing tree 65 within the opening defined within the extended arms of the U-shaped frame 46 whereby the bottom cutting means are in a position for subsequent operation. Thereafter, the delimbing mechanism 30 is then propelled up the standing trees 65 by actuation of the hydraulic cylinder-piston assembly 27 for separation of the multiple block unit 26 which causes speed multiplication of cable 23 with accompanying extension of the traveling mast unit 17 on the stationary mast unit 16 for additional speed multiplication which imparts the necessary momentum to the delimbing mechanism, through cable 43, to cleave all protruding branches encountered by the delimbing mechanism. After delimbing mechanism reaches the desired height, determined by the usable length of the tree, the operator actuates the hydraulic cylinder-piston assembly 42 to cause the top shear blade 39 to rotate in a counterclockwise direction to top the tree at that point.

After the delimbing operation, the delimbing mechanism may be employed at that point as a clamping mechanism, or it may be sufficiently loosened, by partial opening of the extended arm 34, to permit lowering the delimbing mechanism to a lower point on the tree followed by the closing of the extended arm 34 for the desired clamping operation on the tree. With the delimbed tree clamped and supported within the delimbing mechanism 30, the operator actuates the hydraulic cylinder-piston assemblies 57 and 58 to cause the blades 51 and 52 to converge toward each other with attendant severing or cutting of the lower end of the delimbed tree from its stump. As will be noted, during the bottom shearing of the standing tree, the blades 51 and 52, during their convergent movement, are forced against the tree causing it, in substantially fixed abutment with the rear backing plate 55 whereupon the tree is severed by camming and severing action of the blades.

As will be appreciated, as indicated above, the converged position of the shear blade provides a platform to support the delimbed tree thereon for subsequent manipulation, and for this reason, the operator maintains the trees in a converged relationship with each other during subsequent manipulation of the tree. As will also be noted, the upstanding flanges or retaining walls 64 on the shear blades will confine the bottom end of the delimbed tree on the blades during subsequent manipulation of the cut tree for stacking and the like, thus permitting tilting of the tree from a vertical position without danger of the cut tree slipping off the blades. Accordingly, with the delimbed tree clamped within the delimbing mechanism 30 and supported in confinement on the shear blades, by the vertical retaining wall 64, the operator can cause the boom assembly to assume practically any optimum angle or position that he desires. In this manner, the swinghouse assembly 4 of the vehicle 1 can be swung into the appropriate position desired for placing the delimbed tree where it is wanted. When the desired angle or position of the swinghouse assembly is reached, the mast can be pivoted to the angle or position required for depositing and releasing the tree followed by opening of the extended arm 34, of the delimbing mechanism 30, and opening of the shear blades into diverged relationship with each other whereby the tree is readily permitted to fall from the unit, and thus be deposited where desired. It is to be noted that where the delimbing of a standing tree is not desired, the clamping function of the delimbing mechanism may be used alone or with any other suitable tree embracing or clamping structure. In this manner the tree gripping mechanism can be suitably positioned and clamped about a tree, the shears moved into encircling relationship with the tree and actuated together. Thereafter, with the tree gripping mechanism and the shears suitably supporting the undelimbed tree, the tree may be moved for disposition where desired.

Figure 6:
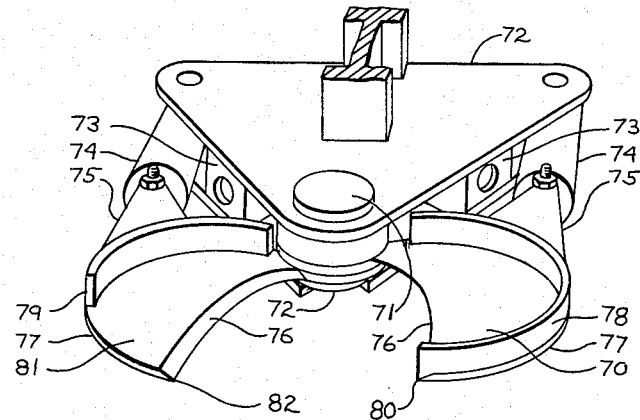
FIGURE 6 is a perspective view of another embodiment of this invention.
Figure 7:
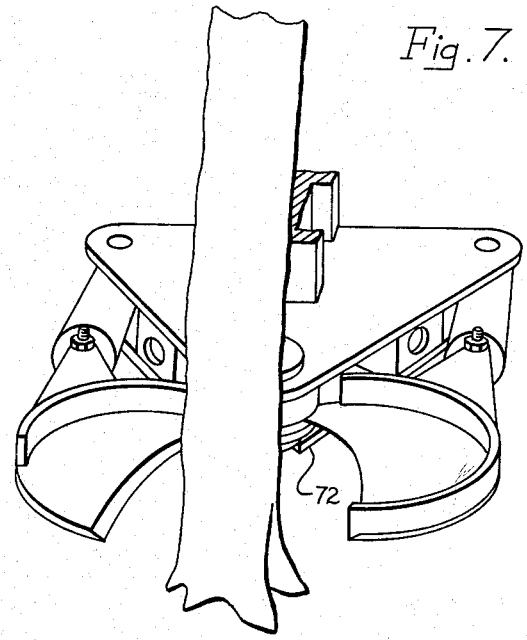
FIGURE 7 is a perspecive view illustrating the operation of the embodiment of FIGURE 6.

Although the preceding embodiment was first described in relationship to a pair of shear blades mounted on the frame structure about spaced pivot points, FIGURES 6 through 8 illustrate another embodiment in which the pair of shear blades 70 are mounted about a common pivot point 71. In this embodiment, the frame of the cutting mechanism may comprise a pair of spaced plates 72 connected together by means of spaced plates 73, with the blades suitably mounted thereabout the pivot 71. Actuation for opening and closing movement of the blade 70 is effected in conventional manner, as for example by hydraulic cylinder-piston assemblies 74 pivotly connected to the shear frame structure and offset portion or arm 75 extended from the shear blades 70. In contrast to the shears of the preceding embodiment, the cutting or leading edge 76 is formed into a convex configuration so as to define a continuously closing and opening between the shears during convergent movement of the shear blade 70 toward each other facilitating confinement of a standing tree therein for cutting thereof. In addition, in accordance with this invention, the shear blades 70 and 81 are provided at their trailing edge 77 with an upstanding or vertical wall or flange 78 and 79, respectively, for co-action with each other to form an upstanding wall to confine cut objects on the top surface of the blades which, as previously, define a platform to support cut objects thereon. However, as will be noted, the upstanding or confining wall 78 provided on shear blade 70 is substantially up to the distal or foremost forward end 80. In contrast the shear blade 81, which passes under the shear blade 70, during the shearing operation, has the forward end of its retaining wall 79 terminating in spaced relationship with the foremost edge or end 82 defined by the apex between the leading edge 76 and the trailing edge 77 of the blade 81. In this manner, the shear blade 81 will be free to pass under the shear blade 70 without encountering interference between the standing retaining walls 78 and 79 while permitting them to be brought in close proximity to one another when the shears 70 and 81 are in converged relationship with one another. However, as will be understood and appreciated, the upstanding walls 78 and 79 may be defined so that one will pass within the other in overlapping relationship when the shear blades 70 and 81 are converged between one another.

Although the invention has been described with reference to specific materials, embodiments and details, various modifications and changes, within the scope of this invention, will be apparent to one skilled in the art and are contemplated to be embraced within the invention.

What is claimed is:
1. A shear comprising
(a) a frame means,
(b) a pair of overlapping blade members adapted for extension in a horizontal plane and pivotally mounted to said frame means for movement to open and closed positions for cutting objects thereby with the upper surface of one of said blade members adjacent the cutting edge thereof having a planar extension thereof adapted to form a platform to support an object cut by said blade means when said blade means is in its closed position,
(c) a vertical extending flange provided adjacent the trailing edge of each of said blade members and forming with said frame means an enclosing wall for said platform when said blade means is in its said closed position so as to enclose and thereby confine cut objects on said platform, the said flange on the blade member having the planar extension thereon terminating at the beginning of said extension, and
(d) actuating means for moving said blade means to said opened and closed positions.

2. The shear of claim 1 wherein said shear is operatively mounted to a mobile vehicle for cutting trees therewith.

3. The shear of claim 2 including a tree gripping means operatively connected to said vehicle and adapted to engage and supportingly clamp a tree prior to cutting thereof by said shear.

4. A shear comprising
(a) a frame means,
(b) a pair of planar cutting blades having leading cutting edges, said blades being adapted for extension in a horizontal plane and being pivotally mounted to said frame means for converging and diverging movement for cutting objects thereby with said blades having co-operative upper planar surfaces adapted to form a platform to support objects cut by said blade when said blades are in their converged relationship,
(c) a vertically extended flange on each of said blades, at least one of said flanges being located adjacent the trailing edge of said blades and terminating in a spaced relation with respect to its said cutting edge and adapted to define with said frame means an enclosing wall for said platform when said blades are in their converged relationship so as to be engageable with and to confine cut objects on said platform, and
(d) means for actuating said blades in their said converging and diverging movement.

5. The shear of claim 4 wherein said shear is mounted to a mobile vehicle for cutting standing trees therewith.

6. The shear of claim 5 including a tree gripping means operatively connected to said vehicle and adapted to engage and supportingly clamp a tree prior to cutting thereof by said shear.

7. A shear comprising
(a) a frame having an opening defining a cradle adapted to receive and seat elongated objects therein,
(b) a cutting blade adapted for extension in a horizontal plane pivotally mounted on each side of said opening in forward projection from their pivots,
(c) means for actuating said blades in converging and diverging movement in a horizontal plane across said opening to enclose an elongated object disposed therein with each of said blades having a sharpened leading edge disposed in opposed relationship to each other and to the bight of said cradle and said blades being disposed in sufficiently vertically off-set relationship to each other to adapt said blades to pass over each other in an overlapping and shearing action during their converging movement across said opening, each of said blades having co-operating upper planar surfaces adapted to form a platform to support an object cut by said blades when said blades are in their converged relationship across their opening, and
(d) a vertically extending flange provided adjacent the trailing edge of each of said blades to define with said frame an enclosing wall for said platform when said blades are in their converged and overlapping relationship across said opening so as to enclose and thereby confine cut objects on said platform, the said flange on the blade member having the planar extension thereon terminating at the beginning of said extension.

8. The shear of claim 7 including a mobile vehicle with said shear operatively connected thereto for cutting standing trees therewith.

9. The shear of claim 8 including a tree gripping means operatively connected to said vehicle and adapted to engage and supportingly clamp a standing tree prior to cutting thereof by said shear.

10. The shear of claim 7 wherein each said leading edge of said blades is of arcuate configuration defining a concave projection on each blade extending inwardly of said opening and toward each other for camming and shearing action against an elongated object disposed in said opening during convergent movement of said blades.

11. The shear of claim 10 including a mobile vehicle with said shear operatively mounted thereto for cutting standing trees therewith.

12. The shear of claim 11 including a tree gripping means operatively connected to said vehicle and adapted to engage and supportingly clamp a standing tree prior to cutting thereof by said shear.

References Cited by the Examiner

UNITED STATES PATENTS 1,915,435 6/33 Miller.
3,074,447 1/63 Bombardier.

FOREIGN PATENTS 24,652 6/51 Finland.

WILLIAM W. DYER, Jr., *Primary Examiner.*

DONALD R. SCHRAN, *Examiner.*